Jan. 30, 1968    C. R. BLOCH    3,365,943
DEVICE FOR ANALYZING THE FLOW MOTION OF A FLUID, ESPECIALLY
ATMOSPHERIC AIR, AT A NUMBER OF LEVELS
ON A SAME VERTICAL LINE
Filed Sept. 10, 1964      2 Sheets-Sheet 1
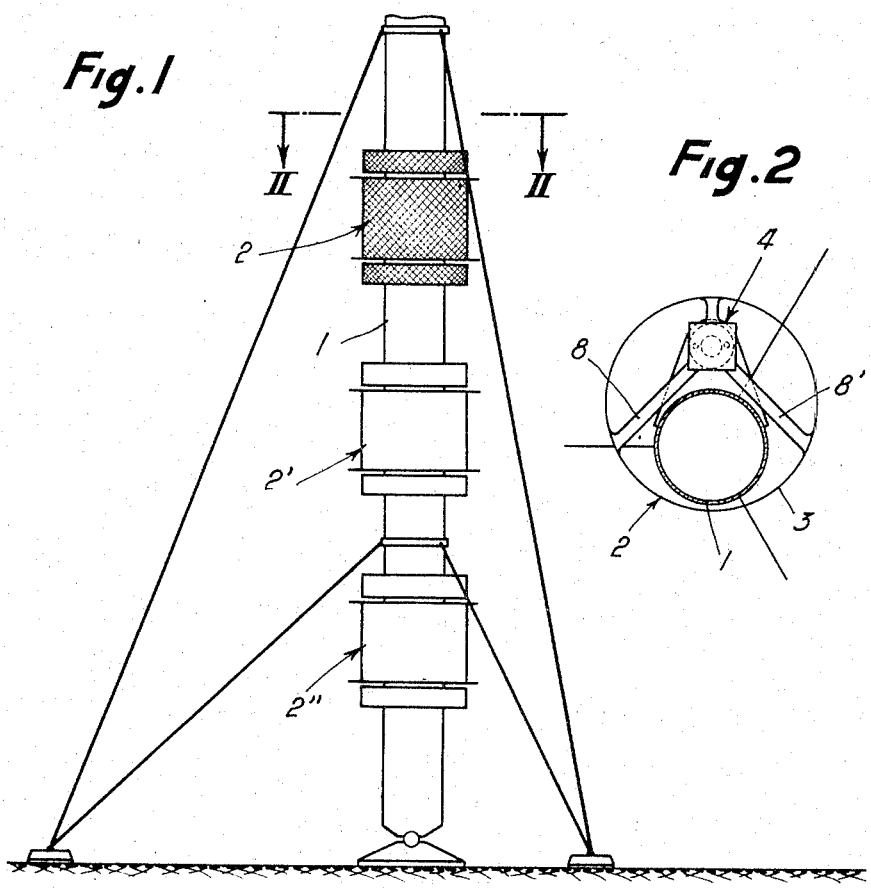
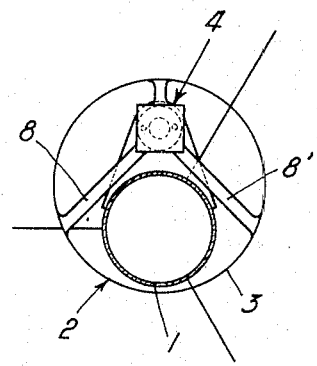
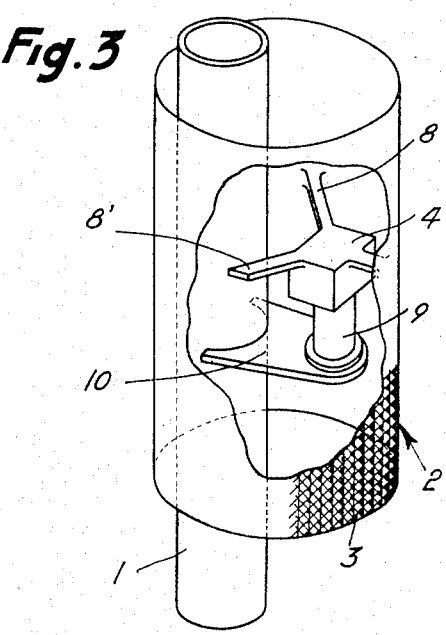
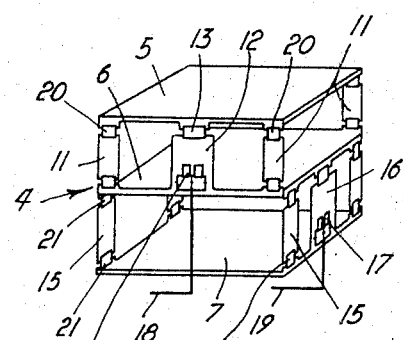
INVENTOR
CHARLES ROBERT BLOCH
BY
*M. A. Hobbs*
ATTORNEY Jan. 30, 1968 C. R. BLOCH 3,365,943
DEVICE FOR ANALYZING THE FLOW MOTION OF A FLUID, ESPECIALLY
ATMOSPHERIC AIR, AT A NUMBER OF LEVELS
ON A SAME VERTICAL LINE
Filed Sept. 10, 1964 2 Sheets-Sheet 2

INVENTOR
CHARLES ROBERT BLOCH
BY
M. A. Hobbs

ATTORNEY

United States Patent Office 3,365,943
Patented Jan. 30, 1968

3,365,943
DEVICE FOR ANALYZING THE FLOW MOTION OF A FLUID, ESPECIALLY ATMOSPHERIC AIR, AT A NUMBER OF LEVELS ON A SAME VERTICAL LINE
Charles Robert Bloch, Paris, France, assignor to Bureau d'Etudes Scientifiques et Techniques, Paris, France, a French company
Filed Sept. 10, 1964, Ser. No. 395,411
Claims priority, application France, Feb. 21, 1964, 964,725, Patent 1,394,280; Apr. 23, 1964, 972,018, Patent 85,634
3 Claims. (Cl. 73—189)

ABSTRACT OF THE DISCLOSURE

An apparatus for analyzing the flow motion of atmospheric air at a number of levels on a vertical line, utilizing cylindrical devices with roughened surfaces mounted on a main support tower and containing flow sensitive elements. The devices are mounted on and supported by the main support in such a manner that the flow sensitive elements are not influenced by the effect of the main support on air flow.

---

In order to carry out wind observations at various levels on a same vertical line, it has been necessary up to the present time to place a number of anemometers on horizontal arms carried by a tower.

By means of such an arrangement, the interaction of the pylon and of the arms on the anemometers is highly inconvenient since it depends on the direction of the wind. In order to make such interaction negligible, provision would have to be made for very thin arms of substantial length which would be liable to vibrate and cause disturbnaces so that, in practice, the problem is almost unsolvable.

The present invention is precisely intended to solve this problem. Accordingly, in order to analyze the flow motion of any fluid and especially that of atmospheric air (wind) at a minimum of two levels on a same vertical line, the invention proposes to place around a main support such as a tower and at different predetermined levels devices which are so arranged and designed that the sensitive elements thereof are mounted on an intermediate support of revolution which is disposed around said main support, in such manner that said sensitive elements are not influenced by the main support.

The apparatuses which are mounted on the main support can be movable, for example of the type comprising a rotor which is coaxial with said support or of the helical type having a horizontal axis and oriented by means of a wind-vane. However, in a preferred form of embodiment, the apparatuses are stationary and each constituted by a roughened cylinder of revolution having a vertical axis and surrounding the main support, said cylinder being mounted on a balance having two rectangular components.

The apparatuses of this type with two components which also form part of this invention provide a number of advantages, especially in that they are easy to calibrate after setting in position by remote-controlled introduction of known forces, and also in that they can readily be checked without dismantling. In addition, said apparatuses indicate both the velocity and the direction of the fluid with very good accuracy.

In one particular form of embodiment, the balance is constituted by two superimposed flexible systems, for example by three parallel plates, one of which is integral with the main support whilst the second is mounted in such manner as to be capable of moving parallel to its own axis in a predetermined direction, the third plate being coupled to the cylinder while being mounted in such a manner as to be capable of moving parallel to its own axis in a direction at right angles to the preceding.

In another form of embodiment, which entails the need to ensure that the distance between the point of application of the aerodynamic resultant of the forces exerted by the fluid and the point of application of the calibration force is negligible, the balance can be constituted simply by a single axial rod, one end of which is secured to the main support and which is fitted with strain gauges on two orthogonal faces.

It will be understood that the balance is preferably housed in the interior of the roughened cylinder.

In a device according to the invention, it is necessary that the main support has a moderate cross-sectional area in order that this latter can traverse apparatuses which are also of moderate size. The small cross-sectional area of the main support creates the need for the provision of guy wires in order to ensure stability of the support.

However, in certain cases, it is not always possible to provide the support with guy wires or else the space available for giving sufficient "slope" to the wires is too limited. It then becomes necessary to adopt supports having large diameters and correspondingly large apparatuses entailing heavy capital outlay.

In order to solve this problem, the present invention proposes to construct the central body of the support by making use of a series of pairs of rigid elements each having a horizontal base and a pointed shape, each pair being juxtaposed at the point or vertex thereof and interposed between two others having a common horizontal base with said pair, the common points or vertices being in principle located on a same vertical line.

The measuring apparatuses can be mounted on supports of this type in such a manner that the common vertices of the pairs of elements are substantially at the centre of said apparatuses, with the result that said apparatuses can have very moderate horizontal dimensions.

Inclined tensioning wires of small diameter, the interaction of which is therefore negligible, could advantageously join the common bases of the elements to each other.

In a preferred form of embodiment, the rigid elements will be polyhedrons and in particular tetrahedrons which can be materialized simply by their edges or arrises in the form of horizontal rods which forms the bases thereof and inclined rods which couple the vertices of said bases to the points of the elements which are located on the vertical axis of the support.

In this case, the inclined tensioning wires could connect in pairs the vertices of one base to the vertices of the following base.

Without any limitation whatever being implied, the accompanying drawings show examples of embodiment of the device in accordance with the invention as applied to the analysis of the motion of atmospheric air (wind).

In these drawings:

FIG. 1 is a view in elevation of the bottom portion of a tower carrying a series of anemometers;

FIG. 2 is a view in cross-section taken along the line II—II of FIG. 1;

FIG. 3 is a detail view in perspective with a portion broken away of one of the measuring apparatuses of FIG. 1;

FIG. 4 is a view on a larger scale and in perspective of the balance of the apparatus of FIG. 3;

Figure 5:
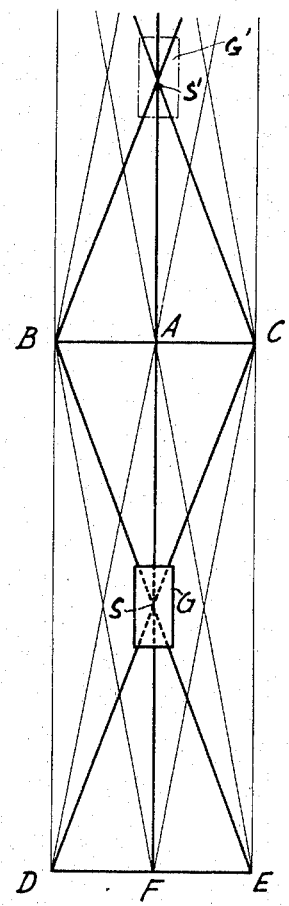
FIG. 5 is a view in elevation of one "stage" of central support body and one portion of the stage which is mounted directly above the preceding.

In the example which is shown in FIGS. 1 to 4, the wind-observation device consists of a tower 1 around which are mounted a series of anemometers 2, 2′, 2″ . . . at the different required levels. The said anemometers each consists of a cylinder 3 having an axis which is is parallel to that of the tower 1 and having a roughened external surface, the said cylinder being coupled to the tower by means of a balance system 4 having two components.

The balance or force responsive means 4 consists of three parallel plates 5, 6, 7 mounted one above the other, the top plate 5 being coupled by means of the rigid arms 8, 8′ to the internal wall of the cylinder 3 and the bottom plate 7 being rigidly coupled by means of the tube 9 and by means of the bracket 10 to the tower 1. Two of the parallel sides of the intermediate plate 6 are coupled to the corresponding sides of the plate 5 by means of rigid plates 11 which are pivotally mounted at the two extremities thereof through the intermediary of thin strips 20 and by means of a flexible strip 12, one extremity of which is pivoted at 13 on the plate 5 whilst the other extremity thereof is fitted in the plate 6. There is attached to said flexible strip 12 at least one active strain gauge 14. The two other parallel sides of the plate 6 are coupled to the corresponding sides of the plate 7 by means of small plates 15 and thin strips 21 and also by means of a flexible strip 16 which is fitted with at least one active strain gauge 17 in the same manner as the plate 6 is coupled to the plate 5.

The gauges 14 and 17 are connected by wires 18, 19 to measuring instruments such as galvanometers.

At each level, the balances 4 of the anemometers 2 supply by virtue of the strain gauges 14 and 17 the two components of the thrust applied on the cylinder 3 and consequently make it possible to obtain the value of the velocity and direction of the wind by means of an elementary calculation, this result being achieved without any interaction which is due either to the tower or to a neighbouring apparatus or to supporting arms.

Figure 6:
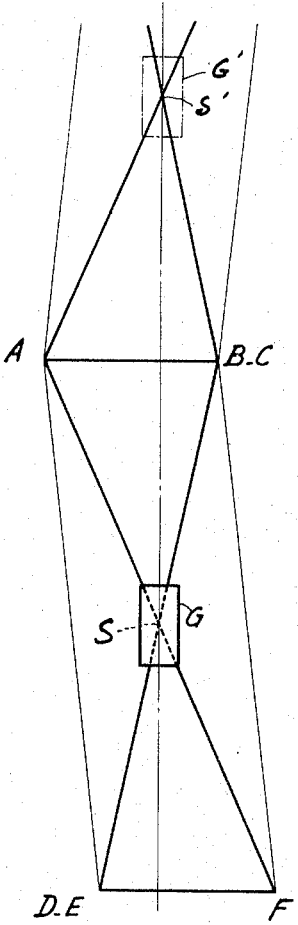
FIG. 6 is a view in elevation taken at right angles to the view of FIG. 5.
Figure 7:
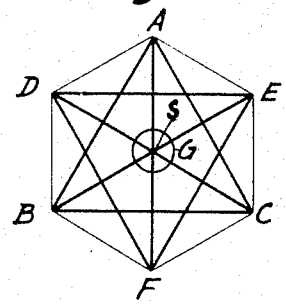
FIG. 7 is a plan view of the stage of FIGS. 5 and 6.

In the modified form illustrated in FIGS. 5 to 7, the support elements are tetrahedrons which are materialized by their edges or arrises in the form of horizontal rods such as AB, AC, BC or DE, EF, DF which form the base and inclined rods SA, SB, SC or SD, SE, SF which connect the vertex or node S, which is common to the two superposed tetrahedrons, to the vertices of the said base.

Anemometric cylinders G, G′ have been shown around the nodes S and S′, and are supported on the tower or main support by a structure similar to that shown in FIGURES 1, 2 and 3. Inclined tensioning wires of small diameter, namely Ad, AE, BD, BF, CE, CF coupled together in pairs the vertices of the bases of the tetrahedrons.

The rods and tensioning wires are shown diagrammatically by their neutral axes and the assembly nodes by their theoretical drawing points.

Provided that a sufficient prestress is induced by the tensioning wires, the inclined rods SD, SE, SF, SA, SB, SC which pass through the cylinder G are always in compression whereas the horizontal rods AB, AC, BC, DE, DF, EF are always in tension, as are the tensioning wires themselves.

The interaction of the tensioning wires is negligible on account of their small diameter while the interaction of the horizontal rods is zero in view of their position half-way between two anemometers G, G′ and the interaction of the inclined rods in compression is zero since they pass through said cylinders G, G′. It is therefore merely necessary to take a few precautionary measures in the installation of the access means (retractable ladders at the level of the cylinders) in order to ensure accurate measurements.

It will be understood that the invention is not limited in any sense to the structural details which have been illustrated or described which have been given solely by way of example. It accordingly follows in particular that the apparatus can be employed for the purpose of analyzing ocean currents or currents of other fluids.

What I claim is:

1. A device for analyzing the flow motion of a fluid, especially atmospheric air, at a number of levels on a same vertical line, comprising a vertically positioned main support, a plurality of stationary cylinders on said support having an axis parallel with the axis of said main support and a substantially uniformly roughened outside lateral surface and surrounding said main support, a plurality of force responsive means fixed to said main support and respectively carrying said cylinders, each means including a first plate fixed to said main support, a second plate parallel with said first plate and flexibly mounted relative to said first plate so as to be capable of moving parallel to its own plane in a predetermined direction, and a third plate parallel with said first and second plates and fixed with said corresponding cylinder and flexibly mounted relative to said second plate so as to be capable of moving parallel to its own plane in a direction at a right angle to said predetermined direction of movement of said second plate, and a means for sensing the movement of said force responsive means having an output proportional to the force exerted on the respective cylinder.

2. A device for analyzing the flow motion of a fluid, especially atmospheric air, at a number of levels on a same vertical line, comprising a vertically positioned main support consisting of a plurality of pairs of structural elements of pointed shape each having a base and a common point and the elements of each pair being juxtaposed at said common point and with parallel bases located on one side and the other of said common point, and each pair being interposed between two other pairs having a common base with said interposed pair, a plurality of intermediate stationary cylinders on said support having an axis parallel with the axis of said main support and a substantially uniformly roughened outside lateral surface and surrounding said main support substantially on the level of said common point of said pairs of elements, and a plurality of means responsive to forces acting horizontally in two directions and carried by said main support and respectively carrying said cylinders, and a means for sensing the movement of said force responsive means having an output proportional to the force exerted on the respective cylinder.

3. A device for analyzing the flow motion of a fluid, especially atmospheric air, at a number of levels on a same vertical line, comprising a main support consisting of a plurality of rods forming a plurality of pairs of tetrahedron elements each having a base and a common point and the elements of each pair being juxtaposed at said common point, and with parallel bases loacted on one side and the other of said common point, and each pair being interposed between two other pairs having a common base with said interposed pair, a plurality of stationary cylinders on said support having an axis parallel with the axis of said main support and a substantially uniformly roughened outside lateral surface and surrounding said main support substantially on the level of said common point of said pairs of tetrahedrons, and a plurality of means responsive to forces acting horizontally in two directions and carried by said main support and respectively carrying said cylinders, and a means for sensing the movement of said force responsive means having an output proportional to the force exerted on the respective cylinder.

(References on following page)

References Cited

UNITED STATES PATENTS

| | | | |
|---|---|---|---|
| 2,204,026 | 6/1940 | Peters | 343—885 |
| 2,747,183 | 5/1956 | Edwards | 343—890 |
| 2,845,796 | 8/1958 | Morison | 73—170 |
| 3,110,175 | 11/1963 | Seed | 73—141 |
| 3,203,236 | 8/1965 | Prince | 73—189 |

RICHARD C. QUEISSER, *Primary Examiner.*

J. J. GILL, *Examiner*

J. J. SMITH, J. W. MYRACLE, *Assistant Examiners.*